April 4, 1933. C. W. BREED ET AL Re. 18,786

RAILWAY JOINT BAR

Original Filed Nov. 3, 1930 5 Sheets-Sheet 1

INVENTORS
CHARLES W. BREED
GEO. R. BURKHARDT
BY
D. P. Wolcan
ATTY

April 4, 1933. C. W. BREED ET AL. Re. 18,786

RAILWAY JOINT BAR

Original Filed Nov. 3, 1930 5 Sheets-Sheet 2

INVENTORS
CHARLES W. BREED
GEO. R. BURKHARDT

BY D. P. Wickersham

ATTY

April 4, 1933. C. W. BREED ET AL Re. 18,786

RAILWAY JOINT BAR

Original Filed Nov. 3, 1930 5 Sheets-Sheet 3

INVENTOR
CHARLES W. BREED
GEO. R. BURKHARDT
BY D. P. Wolcott
ATTY

April 4, 1933. C. W. BREED ET AL Re. 18,786

RAILWAY JOINT BAR

Original Filed Nov. 3, 1930 5 Sheets-Sheet 4

INVENTORS
CHARLES W. BREED
GEO. R. BURKHARDT
BY
D. P. Wakefield
ATTY

April 4, 1933. C. W. BREED ET AL Re. 18,786

RAILWAY JOINT BAR

Original Filed Nov. 3, 1930 5 Sheets-Sheet 5

INVENTORS

CHARLES W. BREED

GEO. R. BURKHARDT

BY D. P. Wickersham

ATTY

Reissued Apr. 4, 1933

Re. 18,786

UNITED STATES PATENT OFFICE

CHARLES W. BREED, OF WESTERN SPRINGS, AND GEORGE R. BURKHARDT, OF CHICAGO, ILLINOIS

RAILWAY JOINT BAR

Original No. 1,809,104, dated June 9, 1931, Serial No. 492,886, filed November 3, 1930. Application for reissue filed November 17, 1931. Serial No. 575,652.

This invention relates to rail joint bar construction embodying the use of upper and lower flanges united by a center member or web, and its purpose is to produce a unit of this character well suited to withstand the bending and torsional strains to which such joint bars are subjected in a railroad track while at the same time securing these properties with a minimum weight of metal in the bar. To this end, within the space available, the distance from outer face to outer face of the bar has been increased permitting the development of large inner flanges than are commonly used without materially curtailing the space available for outer flanges. Accordingly, the present invention has in view a novel principle of metal distribution for producing an unsymmetrical splice bar having a free bending axis at an angle substantially close to the horizontal.

The inner flanges have also been reinforced by providing bracing ribs or brackets integrally formed at intervals and to maintain a substantially uniform cross sectional area throughout the bar, the braces or brackets for the upper flange are disposed in alternating relation to those of the lower flange.

Most shapes of bar used for this purpose are termed unsymmetrical, that is, bending takes place about a line or plane other than the horizontal unless highly restrained and thus introduces stresses much higher than would be expected from the analysis of the properties of the cross sectional area about its horizontal line of centroids.

A purpose of the present invention is to effect such distribution of metal throughout the cross section of the bar that when it is crowded into position between the inclined face of the rail base flange and the oppositely inclined under face of the rail head and subjected to the usual stress of service, the bending action of the bar will take place about an axis not far from the horizontal.

Another purpose is to distribute the metal in the cross sectional area in upper inner and upper outer flanges united by a web to lower inner and lower outer flanges, so that the means of the moments of inertia of the area about its horizontal and vertical gravity axis will be substantially equal to the least moment of inertia of the area about axes at substantially 45° to the horizontal and thru the center of gravity of the cross sectional area of the splice bar. Since the metal distribution contemplates a bar having a free bending axis at an angle substantially close to the horizontal, it will be found that:

$$\frac{\text{Product of inertia } (Jxy)}{\text{Moment of inertia } (Iy)} = \text{substantially zero.}$$

Since the novel metal distribution claimed is susceptible of certain modifications, the above quotient will be found to vary from 0.00 to 0.30 without departing from the scope of the invention.

The invention, therefore, consists in certain features of the design and proportioning of various parts and elements of the structure as hereinafter more fully described and shown in the drawings and as indicated by the claims.

Figure 4:
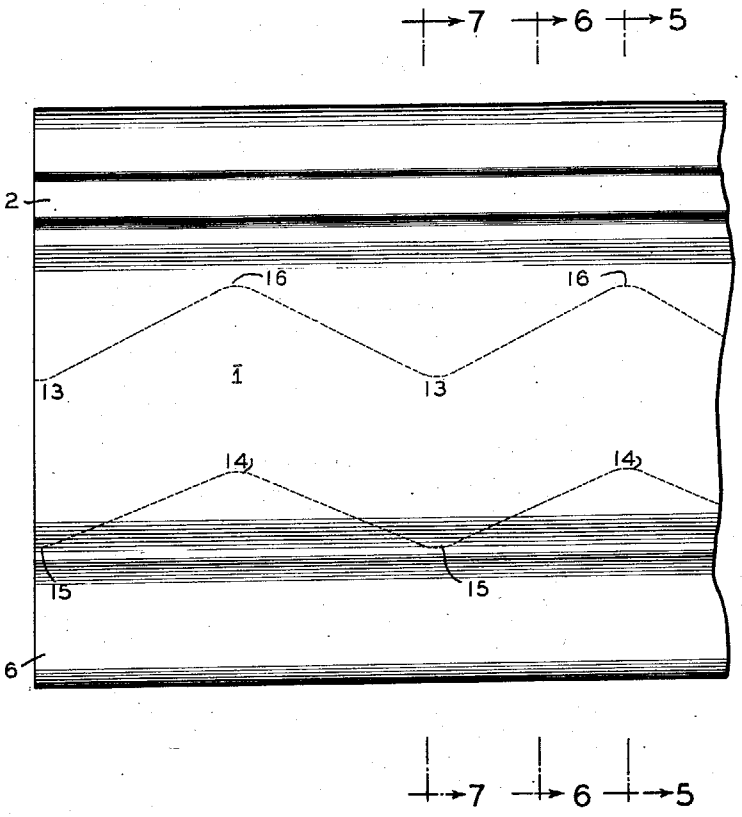
Figure 4 is a side elevation showing the outer face of the bar.
Figure 7:
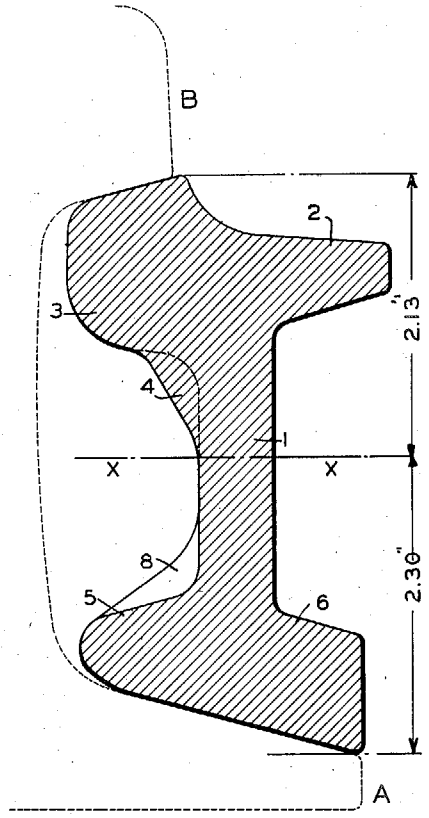
Figure 6:
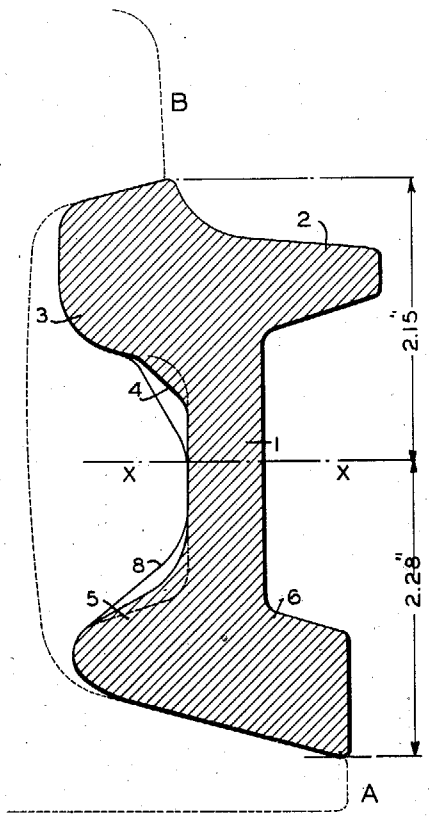
Figure 5:
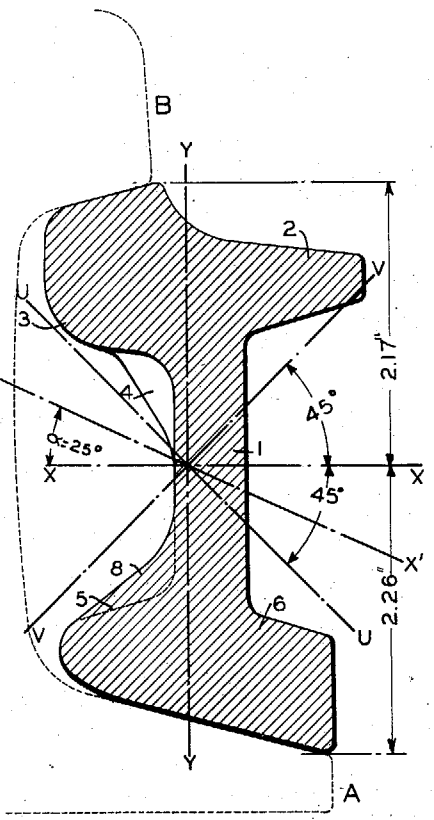

Figures 5, 6, and 7 are vertical cross sections taken as indicated respectively at lines 5—5, 6—6, and 7—7 on Figure 4.

Figure 3:
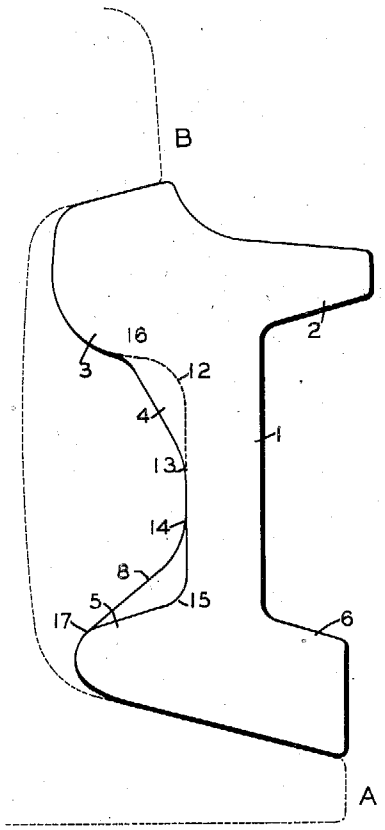
Figure 3 is an end elevation of a joint bar designed in accordance with this invention.
Figure 8:
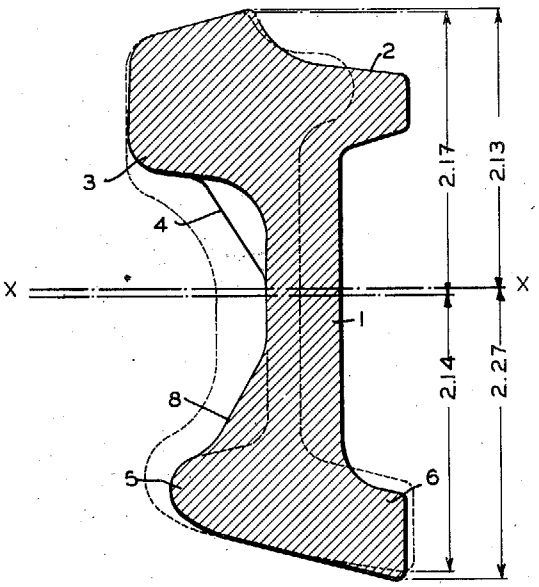

Figure 8 is a diagrammatic sectional view of a modification of the bar shown in Figure 3 and includes the dotted outline of another form of bar for the sake of comparison.

Figure 9:
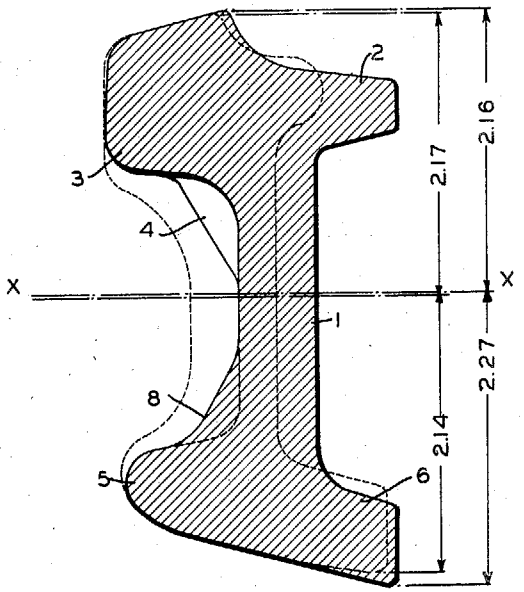

Figure 9 is a sectional view of another modification compared with the same dotted outline as that of Figure 8.

Figure 10:
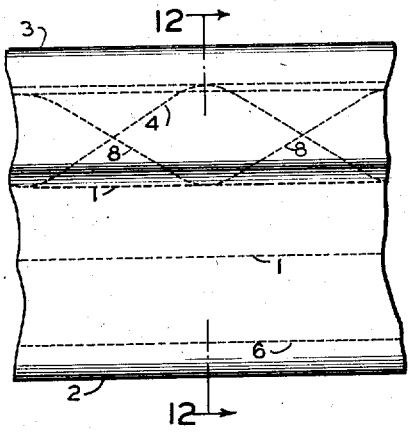

Figure 10 is a top plan view of a joint bar made in accordance with this invention.

Figure 11:
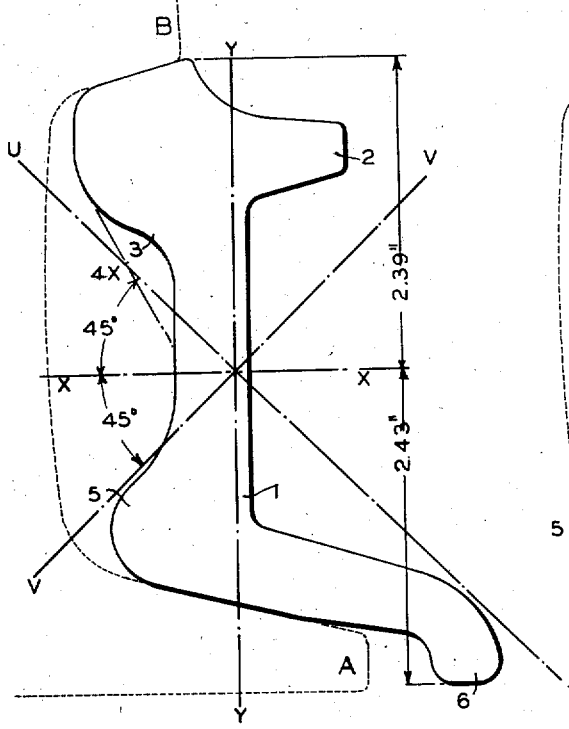

Figure 11 is a diagrammatic outline of the cross sectional shape of a further modification embodying certain of the principles of this invention.

Figure 12:
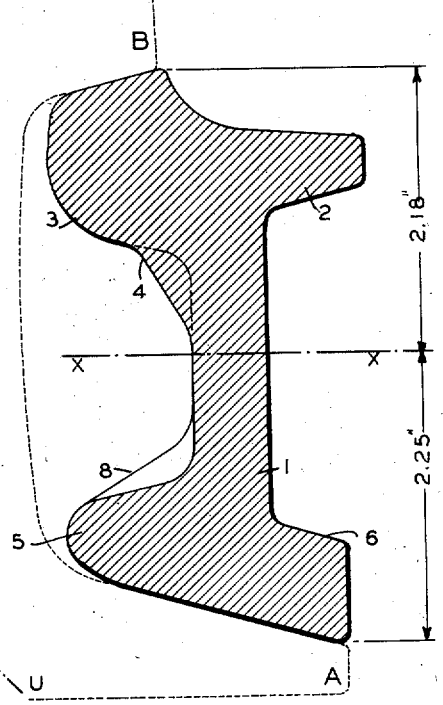

Figure 12 is a transverse section taken as indicated at line 12—12, on Figure 10.

Figure 13:
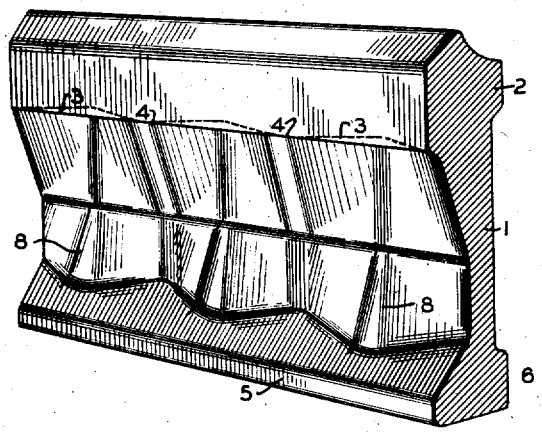

Figure 13 is a perspective view of a fragment of a joint bar embodying this invention showing the inner side of the bar with its integral braces between the web and flanges.

It is well understood by those versed in the art that the moment of inertia of a body is a measure or function of its resistance to bending. For the present purpose the bending under consideration is that which takes place in the plane of any cross sectional area of a joint bar and for this purpose the moment of inertia is a function of the cross sectional area as related to a given line or axis of moments, the mathematical designation in respect to the so-called horizontal neutral axis being $$Ix = \int y^2 dA$$

Generally the moments of inertia of an unsymmetrical area about different lines or axes through the same point are unequal. The principal axes are those at right angles to each other for which the values of moment of inertia are maximum and minimum.

Figure 2:
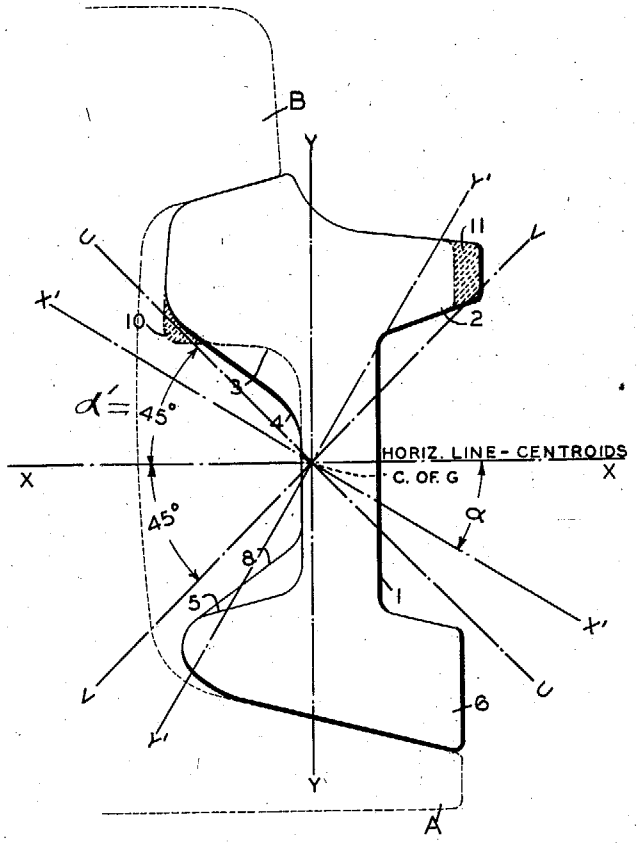
Figure 2 is a diagrammatic outline of the cross section of a bar embodying this invention with certain axes of moment indicated thereon.

Figure 2 shows the horizontal axis X—X and the vertical axis X—Y. The principal axes X′—X′ and Y′—Y′ are drawn at the angle of free bending $\alpha$. The axes of moments U—U and V—V are drawn through the center of gravity at an angle, $\alpha'$, which in this case is 45°.

In the following discussion the value of the inertia moments will be designated:

Moment of inertia about $X—X = Ix$
Moment of inertia about $Y—Y = Iy$
Moment of inertia about $U—U = Iu$
Moment of inertia about $V—V = Iv$ In a symmetrical shape the principal axes are X—X and Y—Y. In an unsymmetrical shape the principal axes are at an angle to the horizontal through the center of gravity.

A function of this angle is known as the product of inertia, it being the summation of the products of the areas by the distances from the center of gravity to horizontal and vertical gravity axes and will be known as $Jxy$. The formulæ is $$Jxy = \int xy dA$$

It is known that $$Jxy = \frac{Ix \cos^2\alpha + Iy \sin^2\alpha - Iu}{2 \sin \alpha \cos \alpha}$$

Also $$\text{Tan } 2\alpha = \frac{2Jxy}{Iy - Ix}$$

Thus the distribution of metal, provided in our invention, increases the value of $Iu$ thus obviously reducing the value of $Jxy$ and the angle $\alpha$. Furthermore, the present invention so distributes the metal in the cross section of the bar as to greatly reduce the value of $\alpha$ compared to that found in ordinary bars while at the same time increasing the moments of inertia about the X—X and Y—Y axes with the utmost economy of metal.

Figure 1:
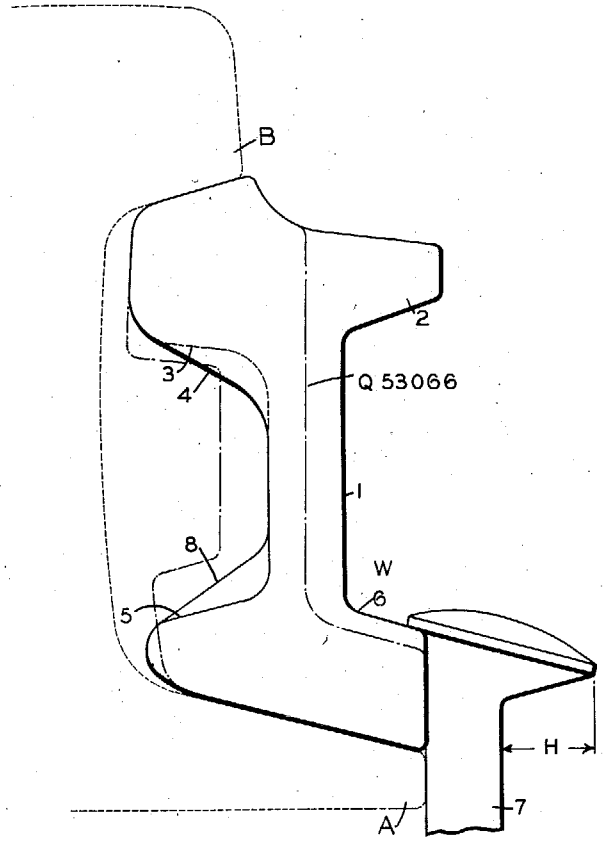
Figure 1 represents the cross sectional outline of a bar designed in accordance with our invention for use with a 110-pound rail and for comparison includes a dot-dash outline of a certain standard form of bar.

Figure 1 represents the outline of a cross section similar to that shown in Figure 2 and superimposed upon the dot-dash outline of the cross section of a certain standard type of bar designated as Q—53,066. In the full line outline, representing the present invention, the web of the bar is indicated at 1, and the upper outer flange at 2. 3 is the upper inner flange while 4 is the outline of an integral bracket or rib formation connecting the upper inner flange with the web and merging into the latter as more clearly shown in the side view of the bar embodied in Figure 3. The inner lower flange 5 and the outer lower flange 6 are joined to the upper flanges by the web 1, and it may be noted that the outer flange 6, terminates outwardly in vertical alignment with the edge of the rail base flange shown at A in dashed outline.

A standard form of track spike is indicated in full outline at 7 for the purpose of comparison of its dimension, H, representing its greatest head projection with the width of the lower outer flange 6, of the joint bar. It will be seen that in our design the web 1, has been shifted outwardly away from the web of the track rail to such an extent that the outer lower flange 6 is of less lateral extent than the dimension H; therefore, at the rail joints the spikes are reversed from their usual position leaving the larger head projection extending away from the rail instead of overhanging the joint bar. The shorter side of the head may thus be engaged with the upper surface of the flange 6, and this is found entirely satisfactory.

In the joint bar itself the outline of a lower bracket or rib 8 is seen connecting the lower flange 5, with the web 1. The head portion of the track rail is indicated at B. In this development of the bar, it will be noted that while the lower outer flange 6 does not extend laterally beyond the vertical plane of the edge of the rail base flange A, the upper outer flange 2 does extend beyond this plane to approximately the extent of the shaded area 11, of Figure 2. At the same time, as compared with the dot-dash outline of the bar Q—53,066 the corner area shaded at 10 in Figure 2 is omitted from the bar developed according to the present invention. The reason for this will be evident upon considering that it is a purpose of this invention to increase the moment of inertia about the U—U axis, and at the same time increase the moment about X—X and Y—Y. Obviously the area 10 being very near to the axis U—U would have very little moment, whereas, this amount of metal applied to the bar at the area 11 is at a considerable distance from the axis U—U giving a greater moment about this axis and also a greater moment about X—X and Y—Y than the area 10.

Figures 3, 4, 5, 6 and 7 illustrate a bar developed in accordance with this invention and quite similar to that shown in Figures 1 and 2, though not identical therewith, the chief difference being in the outline of the intersection of the bracket portions 4 and 8 with the web 1. The intersection of the under side of the upper inner flange 3 with the web 1 is indicated on Figure 3 by the dotted line 12, and it is also shown clearly in the sectional view, Figure 5. The integral brackets 4, which connect the upper flange 3 with the web 1 intersect the vertical face of the web 1, at 13; this intersection is indicated by a dotted line 13 on Figure 4 because this figure is a side elevation of the outer face of the joint bar. The lower brackets 8 are shown intersecting the web 1, at 14, and this intersection is also indicated by the dotted outline on Figure 4. 16 represents the point at which the upper bracket 4 merges with the flange 3, and 17 marks the intersection of the lower bracket, 8, with the top of the flange 5. The normal outline of the flange 5, intersects the web 1, at 15.

The integral brackets 4 and 8, of this design, therefore, approximate the shape of bisected pyramids fitted into angles between the web 1, and the upper and lower inner flanges; and the inner face of the web which remains between the bases of these pyramidal forms is seen in Figure 4 as an area of uniform height but of sinuous outline extending longitudinally of the bar, owing to the alternate positioning of the upper and lower brackets 4 and 8, respectively, which serves to preserve substantially uniform cross section throughout the length of the bar.

Figures 5, 6, and 7, being indicated as cross sections on Figure 4, are substantially self explanatory. The substantial uniformity in mathematical properties of these successive sections is indicated in the table below.

| Area | C. of G. to lowest fibre | C. of G. to highest fibre | Moment of inertia X—X axis | Section modulus below | Section modulus above | Moment of inertia Y—Y axis | Angle α |
|---|---|---|---|---|---|---|---|
| Fig. 5 | | | | | | | |
| 5.14 | 2.26 | 2.17 | 9.66 | 4.27 | 4.55 | 1.55 | 24°-52′ |
| Fig. 6 | | | | | | | |
| 5.13 | 2.28 | 2.15 | 9.62 | 4.22 | 4.47 | ------- | ------- |
| Fig. 7 | | | | | | | |
| 5.11 | 2.30 | 2.13 | 9.55 | 4.15 | 4.48 | ------- | ------- |

Figures 8 and 9 are transverse sections representing slight modifications or deviations from the design, above disclosed, and in each of these figures there is superimposed a dotted outline of a standard form of joint now in use. The sectional outline of Figure 8 presents an area having a moment of inertia approximately equal to that of the dotted outline. From the following table it will be noted that the area itself is slightly smaller indicating that in a bar designed in accordance with our invention the resulting ratio of the moment of inertia to the area affords the more efficient metal distribution.

| Area | C. of G. to lowest fibre | C. of G. to highest fibre | Moment of inertia X—X axis | Section modulus above | Section modulus below |
|---|---|---|---|---|---|
| Section area | | | | | |
| 4.52 | 2.27 | 2.13 | 8.31 | 3.90 | 3.66 |
| Dotted area | | | | | |
| 4.76 | 2.14 | 2.18 | 8.31 | 3.81 | 3.88 |

In Figure 9, the bar has been so designed that its cross sectional area is substantially equal to that of the dotted outline. In this case it will be noted that the moment of inertia about the X—X axis is approximately nine percent (9%) greater for the section area and the moment of inertia about the Y—Y axis is also greater. Furthermore, the angle has been reduced to three-fourths the value of that for the standard bar.

| Area | C. of G. to lowest fibre | C. of G. to highest fibre | Moment of inertia X-X axis | Section modulus above | Section modulus below | Moment of inertia X-X axis | Angle α |
|---|---|---|---|---|---|---|---|
| Section area | | | | | | | |
| 4.74 | 2.27 | 2.16 | 8.95 | 4.14 | 3.94 | 1.23 | 36° |
| Dotted area | | | | | | | |
| 4.76 | 2.14 | 2.18 | 8.31 | 3.82 | 3.88 | 1.04 | 48° |

A bar for 130 lb. R. E. rail, embodying the principles of the present invention, but omitting braces 4 and 8, has the following properties:

| $I_x$ | $I_y$ | $I_u$ | $I_v$ |
|---|---|---|---|
| 14.18 In⁴ | 2.39 In⁴ | 7.96 In⁴ | 8.61 In⁴ |

Hence, $$Jxy = \frac{14.18 + 2.39}{2} - 7.96 = 0.32 \text{ In}^4$$

and by previous equation tan $\alpha = 0.133$ and $\alpha = 7°-30'$

By a slight redistribution of metal, but still incorporating our conception of the relation of the flanges to the axes of moments thru the center of gravity, the angle of free bending was found to be 10° or less. The range of the product of inertia of these bars incorporating our metal distribution ranges from 0.00 $In^4$ to 0.50 $In^4$.

Another bar for 130 lb. R. E. rail having the lower outer flange between the center line of rail and the vertical plane of the edge of the base of rail and embodying the principles of this invention has the following properties:

| $I_x$ | $I_y$ | $I_u$ | $I_v$ |
|---|---|---|---|
| 14.25 $In^4$ | 2.51 $In^4$ | 7.78 $In^4$ | 9.06 $In^4$ |

Hence $$\frac{14.25+2.51}{2}-7.78=0.60\,In^4$$

The comparisons and properties indicate clearly the advantages of our invention, which involves moving the vertical web 1 of the joint bar further away from the web of the track rails than has been customary and then reinforcing the inner flanges which are thus considerably widened; the reinforcement consisting in the integral brackets positioned at intervals as already described. The construction, which we have invented, thus develops a much lower value of $\alpha$ than found in bars of this general shape heretofore and thereby relieving the strain on the bolts used for securement which materially reduces the cost of maintenance involved in the necessary tightening of the bolts in the track.

Figure 11 is an end of elevation or sectional outline of a modification of our invention of the so-called angle type. This bar is designed for use with 110-pound rail and 5½ inch bolts. If a 6-inch bolt is used the braced construction, heretofore described, may be included in the design at 4X. This bar is of the type in which the lower outer flange, 6, overhangs the base flange A of the rail and is usually notched for the rail spikes not shown. It will be seen that in this design, as in that of Figure 2, the upper inner flange lines within the U—U axis of moments which is drawn at 45 degrees to the horizontal axis X—X, while the lower outer flange is kept entirely below this axis extended, the purpose of which will be readily apparent to those skilled in the art.

Figure 13 is a perspective of a portion of a joint bar and illustrates an improved formation for the bracing in such a joint bar. The improvement contemplates a bracing means of a shape readily formed in the rolling process. Present forms offer considerable difficulty, and the metal is often found to be piped due to the nature of the pressure necessary in forming these shapes. Our design contemplates a shape offering little reistance in rolling inasmuch as the brackets 4 and 8 are filleted into web 1 and flanges 3 and 5, as shown. The result is easily obtained by forming the brackets, 4, and 8, into the shape of warped planes. Thus little difficulty is offered in rolling since none of the elements of the planes are parallel, which results in a pure rolling motion.

It will be understood that the designs, herein shown and described, are presented to illustrate the principles of our invention and that we do not limit ourselves specifically thereto except in so far as indicated by the appended claims.

We claim:

1. A rail joint bar comprising inner and outer upper flanges united by a web to inner and outer lower flanges with integral bracing portions at intervals connecting the web to the inner upper flange and terminating downwardly in the web.

2. A rail joint bar comprising inner and outer upper flanges united by a web to inner and outer lower flanges with integral bracing portions at intervals connecting said inner lower flange to the web and terminating upwardly in said web.

3. A rail joint bar comprising an inner upper flange and an inner lower flange united by a web with separate integral braces between said web and said flanges respectively, said braces terminating in the web and being disposed at intervals longitudinally of the bar and the upper braces alternating in longitudinal sequence with the lower braces.

4. In the combination defined in claim 3 said braces being vertically tapered with their small ends merging in the web surface.

5. In the combination defined in claim 3, said braces being vertically tapered with their small ends merging in the web surface so that the cross section of the bar is substantially uniform in area throughout its length.

6. A rail joint bar comprising upper inner and outer flanges united by a web to lower inner and outer flanges with the lower outer flange dimensioned to lie within a vertical projection of the edge of the rail base while the upper outer flange extends beyond said projection.

7. A rail joint bar comprising inner and outer upper flanges united by a web to inner and outer lower flanges in which the width of the lower inner flange is substantially less than the greatest head projection of a standard spike designed to be used with the rail which the bar is dimensioned to serve, and the upper outer flange projecting beyond the vertical plane of the edge of rail base.

8. A rail joint bar comprising inner and outer upper flanges united by a web to inner and outer lower flanges, and in which the width of the lower outer flange does not exceed $\frac{21}{32}$ of an inch, and said flange lies wholly within the vertical plane at the edge of the rail base and the upper outer flange of the bar extends beyond said plane.

9. An unsymmetrical rail joint bar having inner and outer upper flanges united by a web to inner and outer lower flanges, and of such cross section that the inner upper flange lies wholly within axes of moment at right angles to each other and drawn at forty-five degrees to the horizontal axis through the center of gravity of the section while the upper outer flange has its outer corner extend at least to one of said axes.

10. An unsymmetrical rail joint bar having inner and outer upper flanges united by a web to inner and outer lower flanges and of such cross section that the inner upper flange lies wholly within axes of moments at right angles to each other and drawn at forty-five degrees to the horizontal axis through the center of gravity of the section while the upper outer flange extends beyond the vertical projection at the edge of the base flange of the traffic rail with which the bar is designed for use.

11. An unsymmetrical rail joint bar having inner and outer upper flanges united by a web to inner and outer lower flanges, and of such cross section that the inner upper flange lies wholly within axes of moments at right angles to each other and drawn at forty-five degrees to the horizontal axis through the center of gravity of the section, while the upper outer flange has its outer corner extended at least to one of said axes, the lower outer flange lying within the vertical projection at the edge of the rail base.

12. An unsymmetrical rail joint bar having an upper outer flange united to a web and of such cross section that its outermost corner extends beyond an axis of moments drawn at forty-five degrees to the horizontal axis through the center of gravity of the section.

13. In a rail joint bar having upper and lower flanges provided with integral brace portions at intervals terminating in the web and so arranged that the bar is of substantially uniform cross sectional area throughout its length.

14. A rail joint bar comprising an inner upper flange and an inner lower flange united by a web with separate integral braces between said web and said flanges, respectively, said braces being disposed at intervals longitudinally of the bar with upper braces alternating in longitudinal sequence with the lower braces so that the bar is of substantially uniform cross sectional area throughout its length.

15. In a rail joint bar having upper and lower flanges provided with bracing portions at intervals and so arranged that the moment of inertia is substantially uniform for all cross sections of the bar throughout its length.

16. In a rail joint bar having upper and lower flanges provided with integral bracing portions at intervals so arranged that the bar is at substantially uniform cross sectional area throughout its length and that the moment of inertia is substantially uniform for all cross sections throughout the length of the bar.

17. A rail joint bar comprising an inner upper flange and an inner lower flange united by a web with separate integral braces between said web and said flanges, respectively, said braces being disposed at intervals longitudinally of the bar with the upper braces alternating in longitudinal sequence with the lower braces so that the bar is of substantially uniform cross sectional area throughout its length and the moment of inertia is substantially uniform for all cross sections throughout the length of the bar.

18. A rail joint bar having upper inner and outer flanges united by a web to lower inner and outer flanges, said lower outer flange projecting downwardly beyond the edge of the rail base; the upper inner flange lying within axes of moments at right angles to each other and at forty-five degrees to the horizontal axis through the center of gravity of the cross section of the bar and said lower outer flange lying wholly within said axes extended downwardly.

19. An unsymmetrical rail joint having inner and outer upper flanges united by a web to inner and outer lower flanges and of cross sectional area so distributed that the mean of the moments of inertia about its horizontal and vertical gravity axes is substantially equal to the least moment of inertia about lines at forty-five degrees to the horizontal and through the center of gravity of the cross sectional area.

20. An unsymmetrical rail joint bar having inner and outer upper flanges united by a web to inner and outer lower flanges and of cross sectional area so distributed that its free bending axis makes an angle of ten degrees or less with the horizontal.

21. An unsymmetrical rail joint bar having upper inner and outer flanges united by a web to lower inner and outer flanges with lower outer flanges between the center line and edge of base of rail and of cross sectional area so distributed that the ratio $$\frac{\text{Product of inertia}}{\text{Inertia mom. (Vertical gravity axis)}} = 0.30 \text{ or less.}$$

22. An unsymmetrical rail joint bar having upper and lower inner and outer flanges so proportioned to each other and so related, to axes of moments at right angles to each other and at forty-five degrees to the horizontal axis through the center of gravity of the cross-section of the bar, that the product of inertia of the bar is substantially zero; i. e. 0.50 $In^4$ or less.

23. A rail joint bar having upper inner and upper outer flanges united by a web to lower inner and lower outer flanges with integral braces between flanges and web, said braces being spaced at intervals and having their surfaces adjacent the rail bound by warped planes.

24. A rail joint bar comprising inner and outer upper flanges united by a web to inner and outer lower flanges, with integral bracing portions at intervals connecting inner upper flange to the web, the braces having surfaces adjacent the rail defined by warped planes, said planes terminating in the flange.

25. An unsymmetrical rail joint bar having an inner and outer upper flange united by a web to inner and outer lower flanges with the lower outer flange lying between the center line and the vertical edge of the base of the rail and whose cross section has the property:

$$\frac{Ix+Iy}{2}-Iu=0.60\ In^4 \text{ or less.}$$

26. An unsymmetrical rail joint having upper inner and outer flanges united by a web to lower inner and outer flanges with the intersection of the under and outer planes of the upper outer flange projected at least to an axis of moments drawn at forty-five degrees to the horizontal axis through the center of gravity of the section.

27. An unsymmetrical rail joint bar having upper inner and upper outer flanges united by a web to lower inner and lower outer flanges with the upper inner flange lying within axes of moments at 45° to the horizontal and thru the center of gravity of the cross sectional area and the intersection of the under and outer planes of the upper outer flange projected at least to one of said axes of moments.

In testimony whereof we hereunto affix our signatures.

CHARLES. W. BREED.
GEORGE R. BURKHARDT.